United States Patent
Akcayoz et al.

(10) Patent No.: US 10,514,003 B2
(45) Date of Patent: Dec. 24, 2019

(54) EXHAUST DUCT

(71) Applicant: Pratt & Whitney Canada Corp., Longueuil (CA)

(72) Inventors: Eray Akcayoz, Montreal (CA); Francois Doyon, Ste-Julie (CA); Julie Demers, St-Hubert (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1085 days.

(21) Appl. No.: 14/972,195

(22) Filed: Dec. 17, 2015

(65) Prior Publication Data

US 2016/0177872 A1    Jun. 23, 2016

Related U.S. Application Data

(60) Provisional application No. 62/093,080, filed on Dec. 17, 2014.

(51) Int. Cl.
| | |
|---|---|
| *F02K 1/40* | (2006.01) |
| *F01D 25/30* | (2006.01) |
| *F02K 1/78* | (2006.01) |
| *F02C 6/20* | (2006.01) |

(52) U.S. Cl.
CPC ............... *F02K 1/40* (2013.01); *F01D 25/30* (2013.01); *F02C 6/206* (2013.01); *F02K 1/78* (2013.01); *F05D 2250/52* (2013.01); *F05D 2250/73* (2013.01)

(58) Field of Classification Search
CPC ... F02K 1/40; F02K 1/78; F01D 25/30; F05D 2250/52; F05D 2250/73
See application file for complete search history.

(56) References Cited

U.S. PATENT DOCUMENTS

| | | | |
|---|---|---|---|
| 3,146,590 A | 9/1964 | Erwin | |
| 3,290,877 A * | 12/1966 | Millar | F01D 25/30 415/211.2 |
| 3,388,550 A | 6/1968 | Binek | |
| 6,959,552 B2 | 11/2005 | Leblanc | |
| 7,937,929 B2 | 5/2011 | Farber | |
| 8,099,943 B2 | 1/2012 | Farber | |
| 8,266,906 B2 | 9/2012 | Wu et al. | |
| 9,016,067 B2 | 4/2015 | Miklos | |
| 9,027,350 B2 | 5/2015 | Roesler | |
| 2009/0001216 A1 | 1/2009 | Kirstein | |
| 2010/0199626 A1 | 8/2010 | Harding et al. | |

(Continued)

FOREIGN PATENT DOCUMENTS

| | | |
|---|---|---|
| EP | 2492628 A1 | 8/2012 |
| JP | 58144610 A | 8/1983 |

OTHER PUBLICATIONS

EP Search Report for corresponding EP Publication No. 15200764 dated Sep. 5, 2016.

*Primary Examiner* — Carlos A Rivera
(74) *Attorney, Agent, or Firm* — Norton Rose Fulbright Canada LLP

(57) ABSTRACT

An exhaust duct for a gas turbine engine has an annular inlet conduit having an inlet axis. At least two outlet conduits branch off from the inlet conduit along respective outlet centerlines that are distinct from one another. The outlet centerlines when projected onto a projection plane perpendicular to the inlet axis are spaced apart from the inlet axis so as not to intersect the inlet axis.

17 Claims, 7 Drawing Sheets

(56) References Cited

U.S. PATENT DOCUMENTS

| | | |
|---|---|---|
| 2013/0174551 A1 | 7/2013 | Mahmoud et al. |
| 2017/0314574 A1 | 11/2017 | Fuchs et al. |
| 2018/0080324 A1 | 3/2018 | Lymn et al. |
| 2018/0298914 A1 | 10/2018 | Nakamura et al. |

* cited by examiner

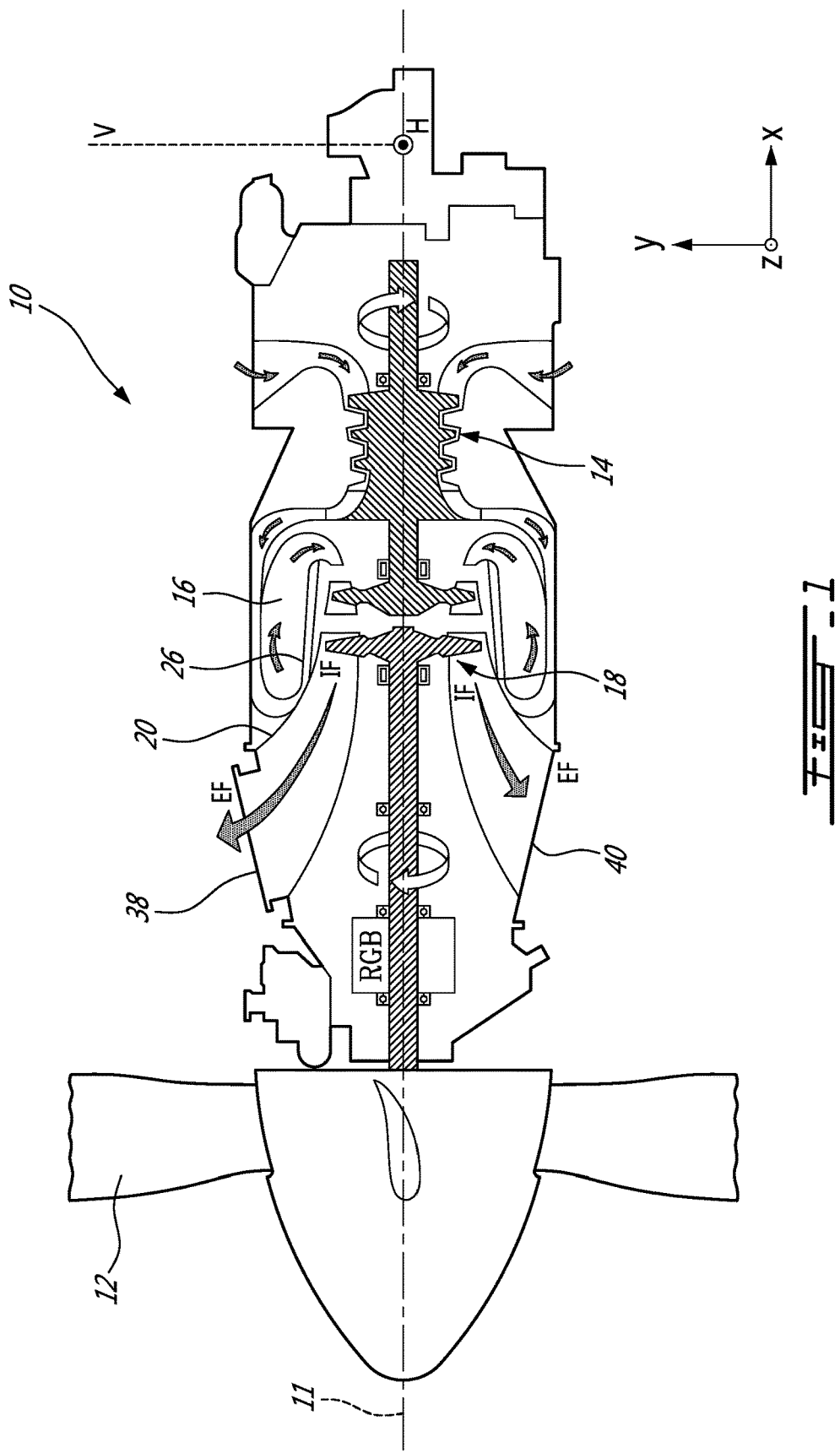

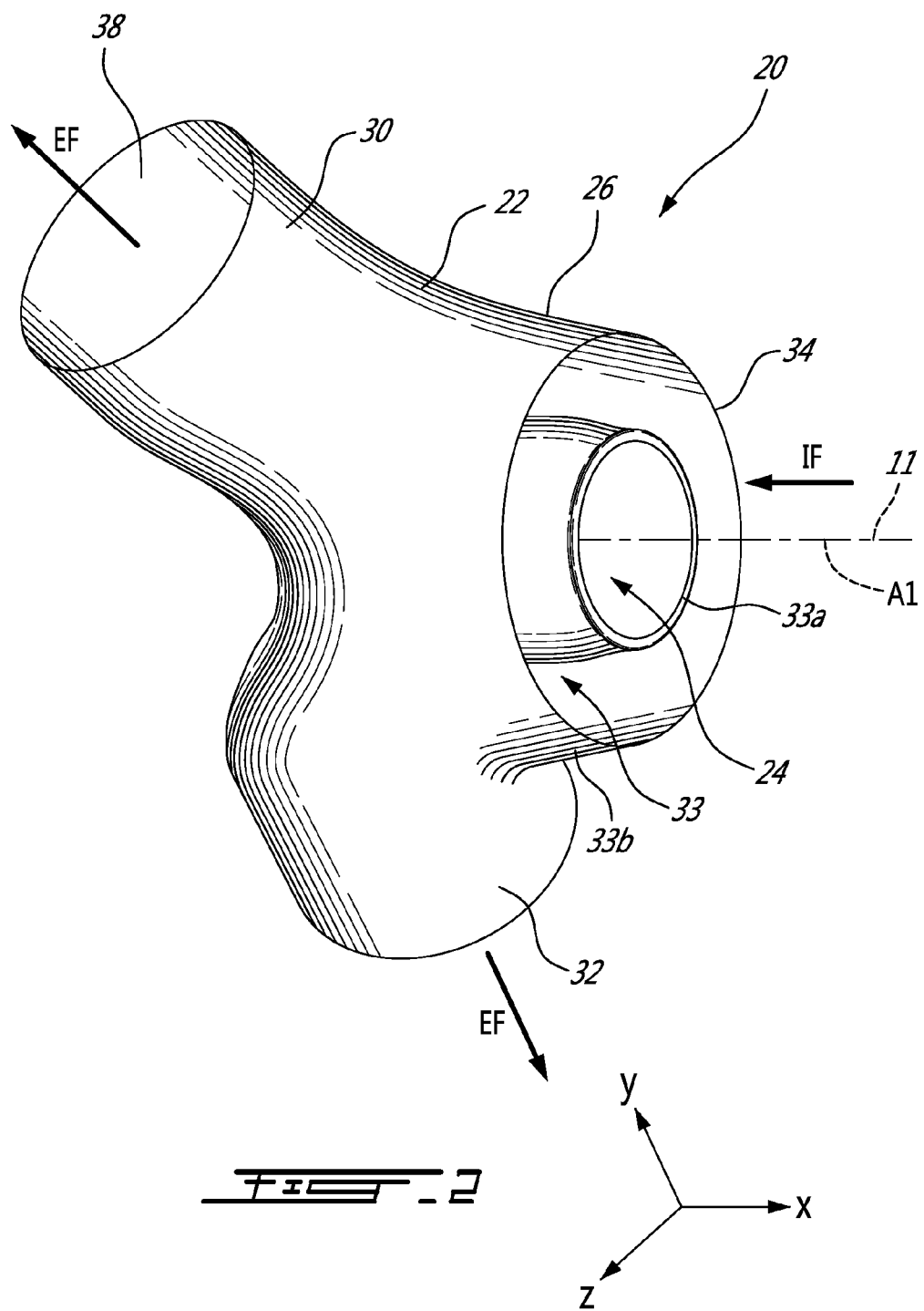

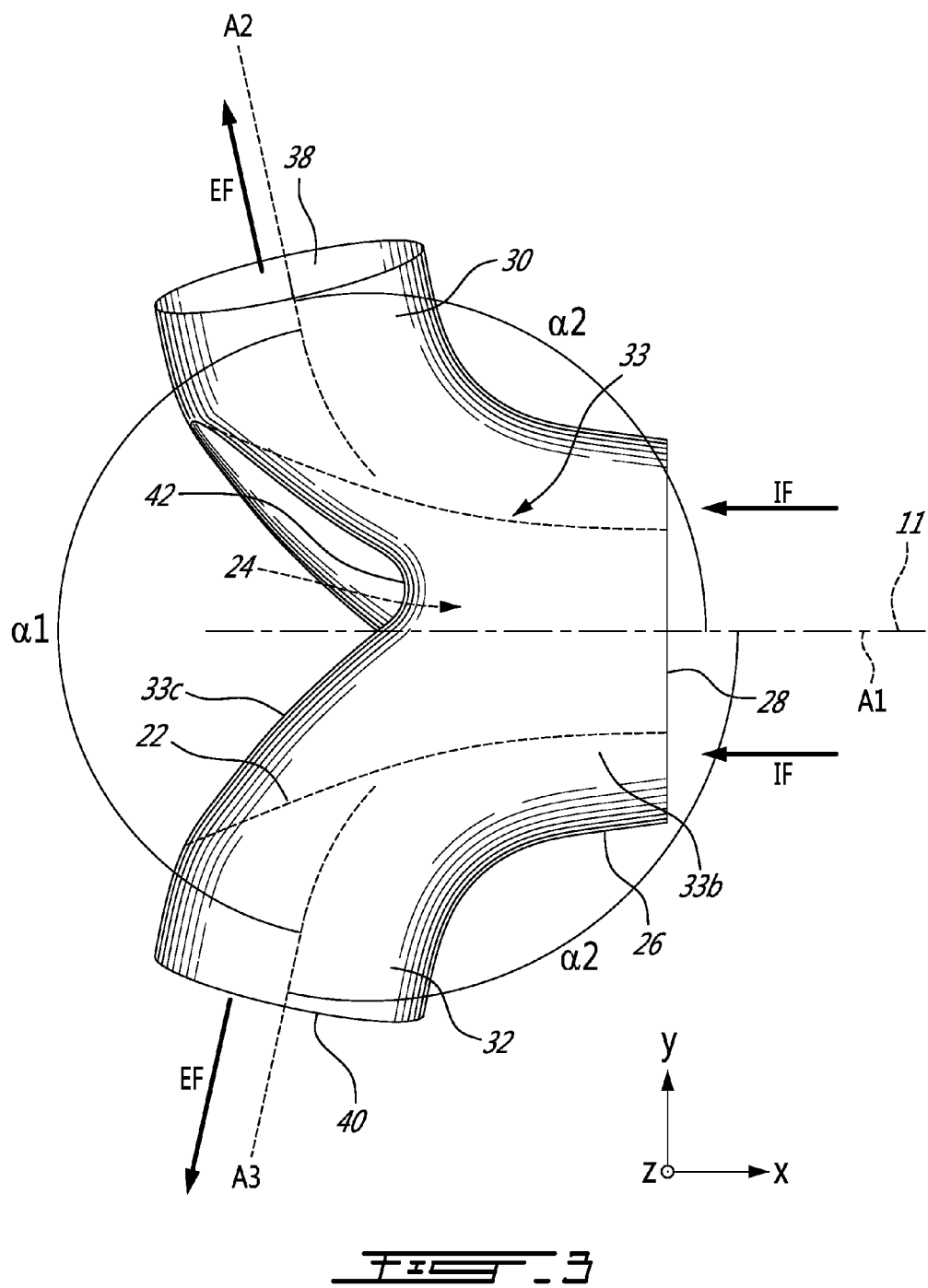

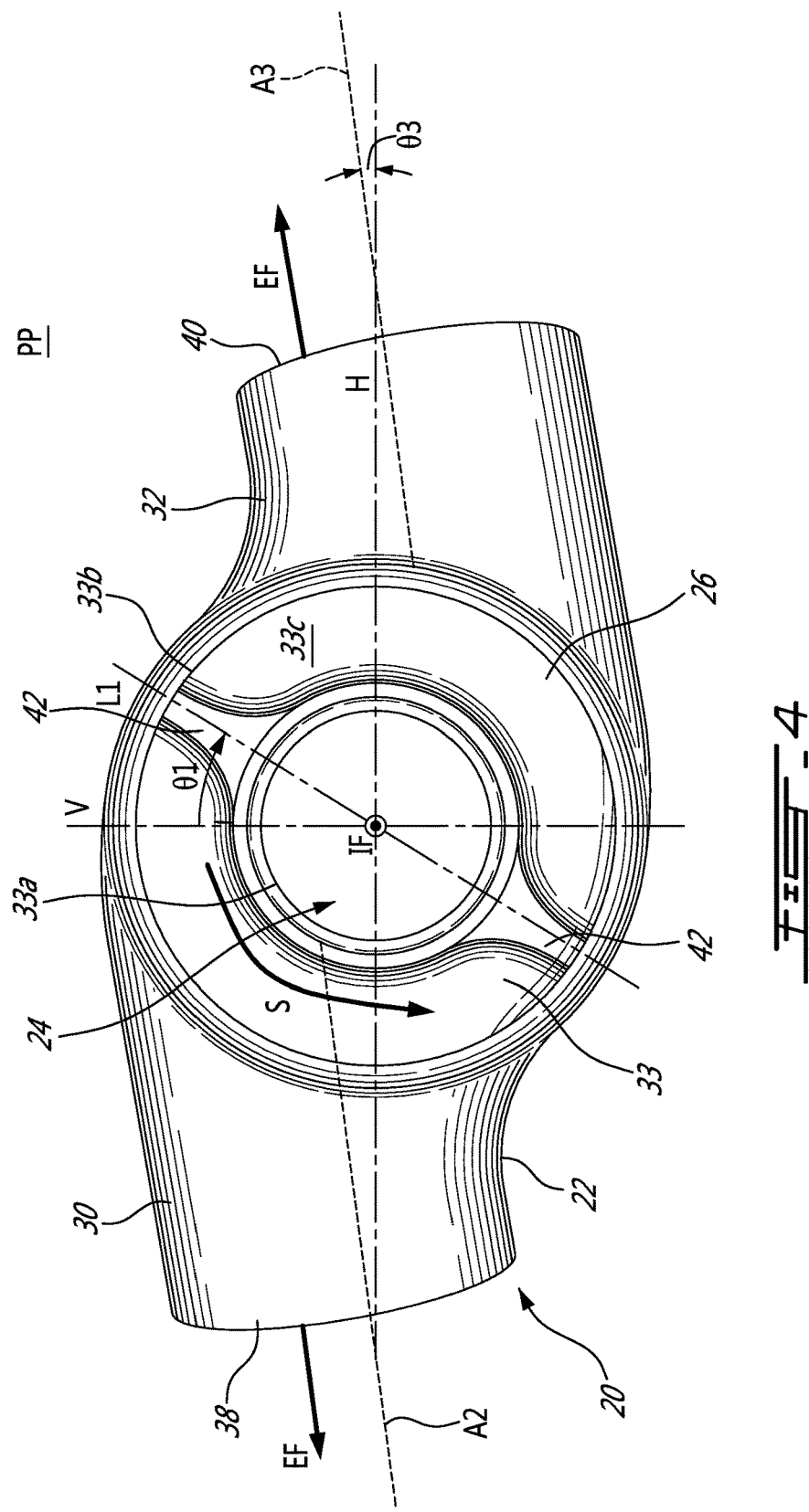

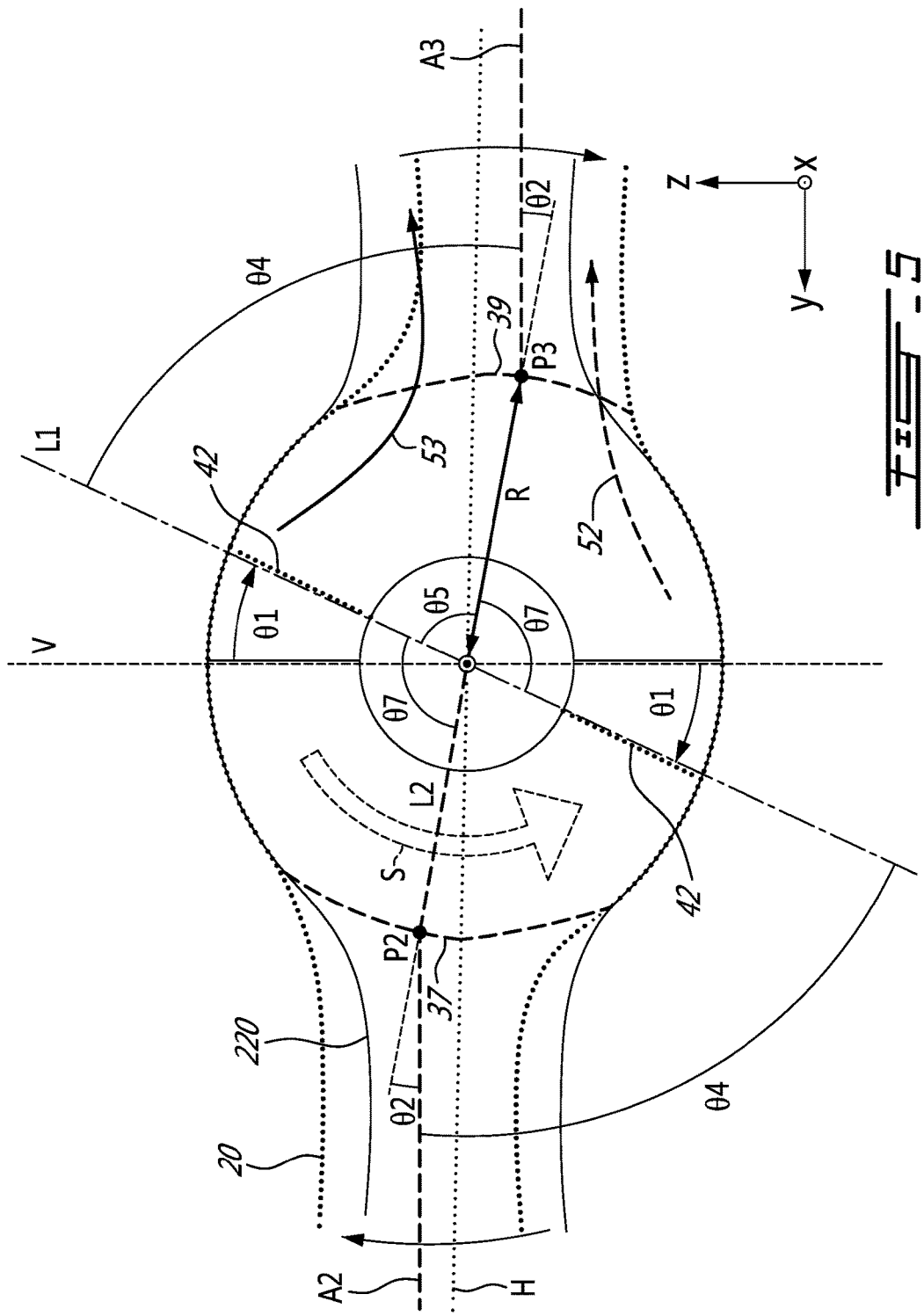

EXHAUST DUCT

CROSS-REFERENCE TO RELATED APPLICATION

This application claims priority to U.S. provisional patent application No. 62/093,080, entitled "Exhaust Duct", filed Dec. 17, 2014, the entire contents of which are incorporated by reference herein.

TECHNICAL FIELD

The application relates generally to gas turbine engines and, more particularly, to exhaust ducts in gas turbine engines.

BACKGROUND

Exhaust ducts are disposed after the turbine section and evacuate gases that have been used to power the turbine. The flow entering into the outlet may be swirling and have a substantial velocity which may be used as a residual thrust to the engine. Swirling of the gases may produce total pressure loss which in turn may reduce the residual thrust available.

SUMMARY

In one aspect, there is provided an exhaust duct for exhausting combustion gases of a gas turbine engine, the exhaust duct comprising: an annular inlet conduit having an inlet centerline A1 defining an axial direction, the inlet conduit configured to direct combustion gases generally in the axial direction and with a swirl direction about the inlet centerline A1, the exhaust duct further comprising at least two outlet conduits communicating with the inlet conduit and extending generally radially outward relative to the inlet conduit along respective outlet centerlines A2, A3, wherein when projected in a Y-Z plane orthogonal to the inlet centerline A1, the outlet centerlines A2, A3 are non-coaxial and clocked in an opposite direction to the swirl flow direction.

In another aspect, there is provided an exhaust duct for exhausting a swirling flow of combustion gases of a gas turbine engine defining X-Y-Z orthogonal axes, the exhaust duct comprising: an annular inlet conduit having an axial extension along the X axis, at least two outlet conduits branching off from the annular inlet conduit, and at least one pair of diametrically opposed splitters in the annular inlet conduit and extending generally along the X axis, the at least two outlet conduits being dissymmetric relative to a splitter line L1 defined by the at least one pair of diametrically opposed splitters.

According to a further general aspect, there is provided an exhaust duct for exhausting a swirling flow of combustion gases received from a turbine section of a gas turbine engine defining X-Y-Z orthogonal axes, the exhaust duct comprising: an annular inlet conduit circumscribed by a circumscribing wall having an axial extension along the X axis, and at least two outlet conduits branching off from the annular inlet conduit, the at least two outlet conduits extending through the circumscribing wall of the annular inlet conduit along respective outlet centerlines A2, A3 that are distinct from one another, wherein when projected onto plane Y-Z: the outlet centerlines A2, A3 of the at least two outlet conduits intersect the circumscribing wall of the annular inlet conduit at respective intersection points P2, P3, wherein a radius R of the annular inlet conduit passes through each of the intersection points P2, P3, a radius angle θ2 is defined from respective outlet centerlines A2, A3 to the radius R, and wherein the radius angle θ2 is acute and in a direction opposite to an anticipated swirling flow direction of the combustion gases.

In accordance with a further aspect, there is provided an exhaust duct for exhausting combustion gases of a gas turbine engine, the exhaust duct comprising: an annular inlet conduit having an axis A1, an outer wall having a radius from the axis, the inlet conduit configured to direct combustion gases generally in the axial direction and with a swirl direction about the axis A1, the exhaust duct further comprising at least two outlet conduits extending generally outwardly radially relative to the inlet conduit along respective outlet centerlines A2, A3, wherein when projected in a Y-Z plane orthogonal to the axis of the inlet conduit, the outlet centerlines A2, A3 are non-coaxial and wherein a non-zero, positive outlet conduit angle θ2 exists between the centrelines A2, A3 and a line along the radius intersecting the centrelines A2, A3 at the outer wall of the inlet conduit when projected into the Y-Z plane and measured in a rotational direction opposite to the swirl direction.

In accordance with a still further general aspect, there is provided an exhaust duct for exhausting combustion gases of a gas turbine engine, the exhaust duct comprising: an annular inlet conduit having an axis A1, an outer wall having a radius from the axis, the inlet conduit configured to direct combustion gases generally in the axial direction and with a swirl direction about the axis, the exhaust duct further comprising at least two outlet conduits extending generally outwardly radially from the inlet conduit along respective outlet centerlines A2, A3, the inlet conduit having a splitter therein upstream of each outlet conduit relative to the swirl direction, each splitter defining a splitter line L1 passing radially through the splitter and the axis A1, the splitter located relative to centerline A2, A3 of the respective downstream outlet conduit by a clocking angle θ7 defined between the respective centerline A2, A3 and the splitter line L1 when projected in a plane orthogonal to the axis, and wherein θ7 is greater than 90°.

DESCRIPTION OF THE DRAWINGS

Reference is now made to the accompanying figures in which:

FIG. 1 is a schematic cross-sectional view of a gas turbine engine;

FIG. 2 is a schematic isometric view of an exhaust duct for the gas turbine engine;

FIG. 3 is an orthogonal projection of the exhaust duct in plane X-Y;

FIG. 4 is a rear view of the exhaust duct corresponding to an orthogonal projection of the exhaust duct in plane Y-Z;

FIG. 5 is a schematic rear plan view of the exhaust duct showing clocking of the splitter and the outlet ports, superimposed with a schematic rear plan view of an exhaust duct having no clocking;

DETAILED DESCRIPTION

Figure 6A:
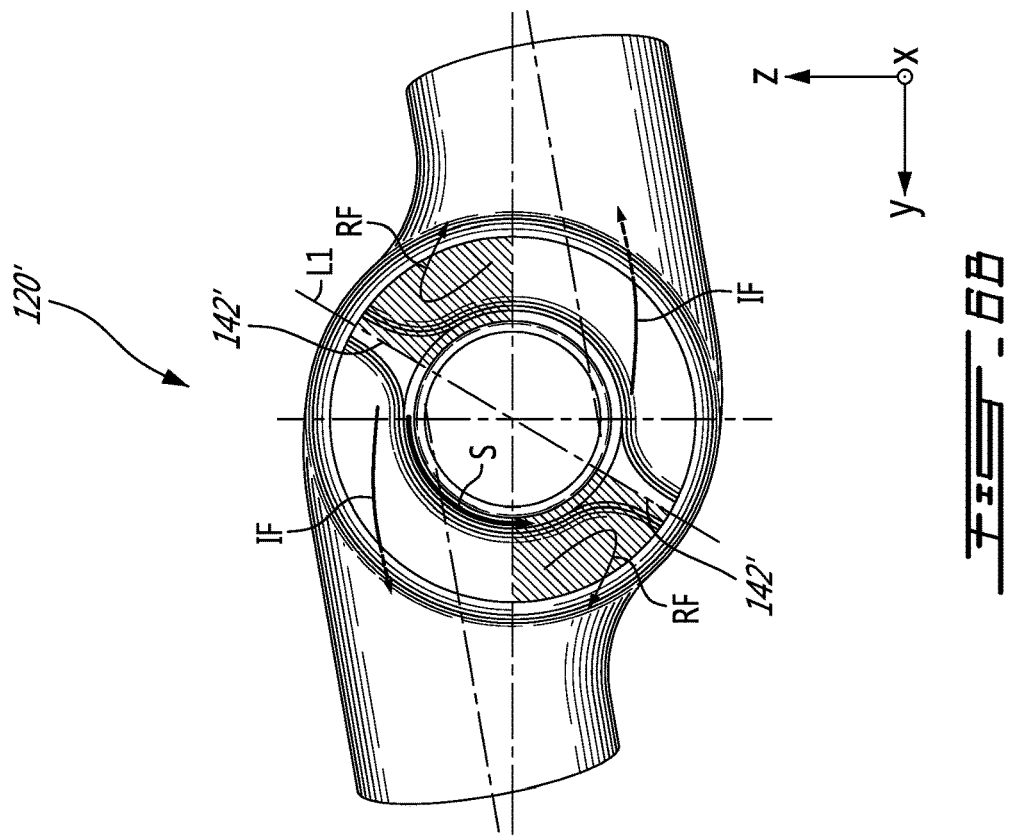
FIG. 6A is a schematic rear plan view of an exhaust duct having unclocked splitters annotated to show a possible reverse flow area.

FIG. 1 illustrates a gas turbine engine 10, in this example a turboprop engine, of a type preferably provided for use in subsonic flight, generally comprising in serial flow communication along an engine axis 11 (parallel to the X axis of the orthogonal axes shown in the drawings), a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases and communicating this energy to the propeller 12. The exhaust gases are expelled via an exhaust duct 20. The exhaust gases are illustrated by arrows IF and EF, indicating the incoming flow and outlet flow relative to the exhaust duct 20 (see also FIGS. 2 and 3).

Referring to FIGS. 2 and 3, the exhaust duct 20, in this embodiment a dual ports exhaust duct, is formed by a generally Y-shaped body 22. The body 22 defines a fluid flow passage(s) about a central bore 24 for accommodating a shaft engine. The fluid flow passage of the annular body 22 generally includes an inlet conduit 26 through which the bore 24 extends, and in this example two outlet or exhaust conduits 30, 32 branching off from the inlet conduit 26. It is understood that the inlet and outlet conduits 26, 30, 32 may adopt various configurations. For instance, they can take the form of cylindrically straight or curved conduits. If desired the body 22 may include more than two outlet conduits 30, 32. The inlet conduit 26 may be provided in the form of an annular inlet conduit 33 wherein the first (inlet) 26, second and third (exhaust or outlet) conduits 30, 32 connect and communicate. The outlet conduits 30, 32 may not be perpendicularly positioned relative to the inlet conduit 26 (i.e. be purely radially oriented with respect thereto), but rather may extend both radially and axially with respect thereto. Therefore, the body 22 could adopt various configurations including T-shaped and Y-shaped configurations. It is understood that any suitable configurations for the inlet and exhaust conduits may be used.

The inlet conduit 26 has an axial extension extending about a centerline A1 that, in this example, is aligned with the engine axis 11 (and thus parallel to the X axis of the X-Y-Z orthogonal axes shown in the drawings) of the gas turbine engine 10. The term "centerline" is herein intended to generally refer to line joining the centres of the annuli making up the conduit along its length, which corresponds to the general axis of the conduit. It is understood, however that the conduit need not be exactly circular in cross-section. The inlet conduit 26 includes an inlet end 34 located adjacent the turbine section 18. The inlet end 34 receives the inlet flow IF of exhaust gases from the turbine section 18.

The outlet conduits 30, 32 are generally cylindrical in shape in this example (though any suitable shape may be employed) and have respective outlet centerlines A2 and A3 which extend at an angle α1, as shown in FIG. 3, relative to each other. The centerlines A2 and A3 of the outlet conduits 30, 32 also extend at an angle, in this example the same angle α2, relative to the centerline A1. The outlet conduits 30, 32 have corresponding inlet ends 37, 39 (FIG. 5) and outlet ends, or outlet ports 38, 40 (also shown in FIG. 1) of the exhaust duct 20. The inlet ends 37, 39 are defined at the intersection between the conduit 33 and the outlet conduits 30, 32, as shown schematically by the dotted lines 37, 39 in FIG. 5.

Turning now to FIG. 4, the conduit 33 is annular about centerline A1, which also defines the central axis of the conduit 33. The conduit 33 has inner peripheral wall 33a and outer peripheral wall 33b. The outer wall 33b is a circumscribing wall of the conduit 33, and constitutes a periphery of the conduit 33. The conduit 33 may include two circumferentially spaced-apart splitters 42. The splitters 42 may take the form of raises or bumps formed inside the body 22 at a bottom 33c of the conduit 33 and project in a direction toward the inlet conduit 26. The splitters 42 are configured to split the inlet flow IF upstream of the flow impacting the bottom or downstream end 33c of the conduit 33, and to deflect the inlet flow IF into the multiple (two, in this example) outlet flows EF to be directed to the outlet ports 38, 40. Splitters 42 may be omitted (for instance the body 22 may be a T-shaped body), and the inlet flow IF could split when impacting the bottom 33c of the conduit 33.

Figures 7A, 7B:
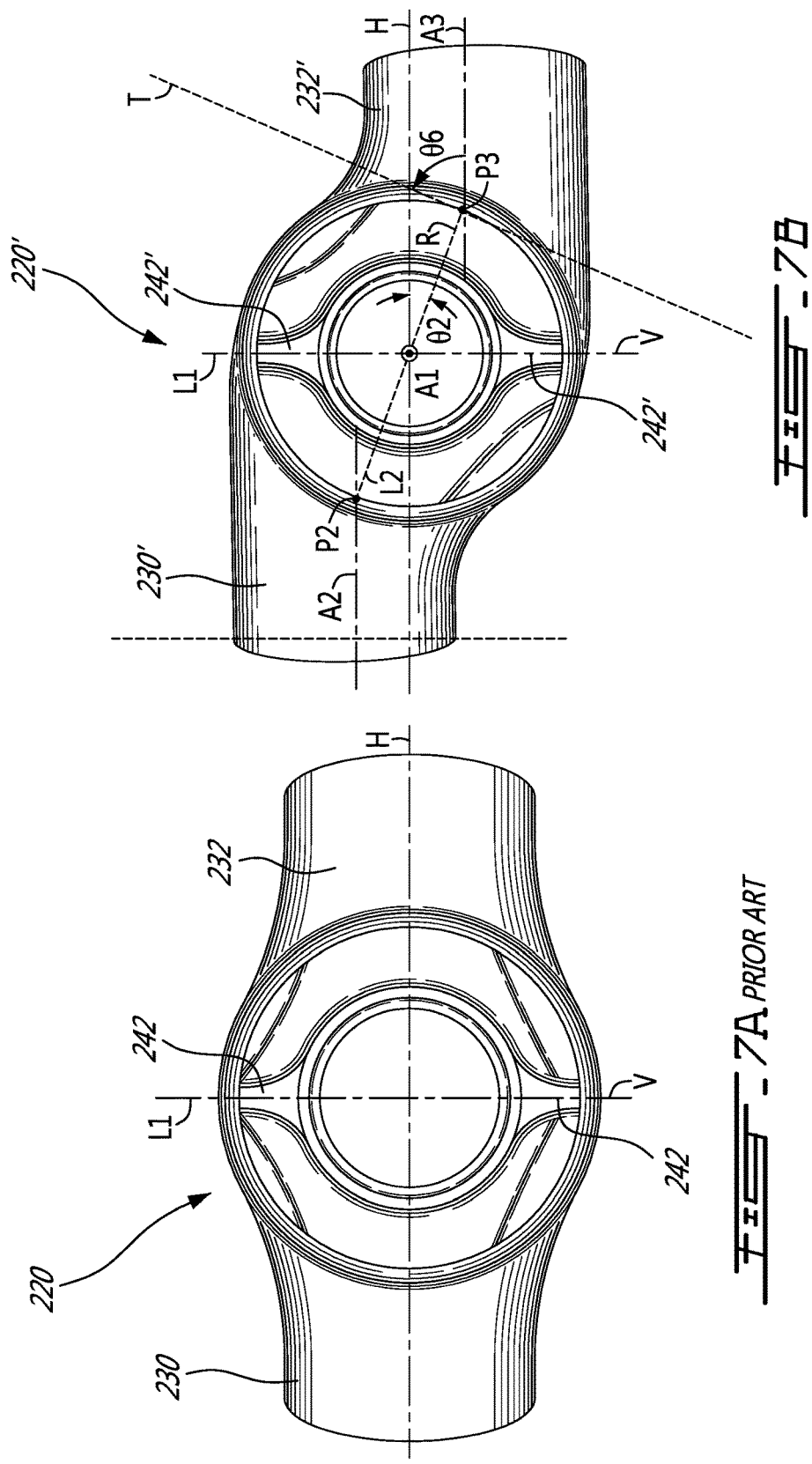
FIG. 7A is a schematic rear plan view of an exhaust duct having unclocked splitters and unclocked outlet conduits.
FIG. 7B illustrates an exhaust duct having unclocked splitters and offset outlet conduits.

The exhaust duct 20 is clocked to enhance flow rate therethrough toward the outlet ports 38, 40. The clocking may be of the splitters 42 and/or the outlet conduits 30, 32. Clocking, as will be apparent below, refers to the angular position of the splitters 42 and/or outlet conduits 30, 32 (as the case may be) relative to the axis A1. Referring to the prior art exhaust duct 220 of FIG. 7A, the splitters 242 and outlet conduits 230, 232 in that case are a symmetric "mirror-image" relative to a vertical reference plane V (X-Z plane) and/or the horizontal plane H (X-Y plane). Referring to FIG. 7B, however, the outlet conduits 30, 32 are clocked relative to the axis A1, so as no longer to be symmetrical. The exhaust duct of FIG. 7B will be considered in more detail below. As opposed to the arrangement shown in FIG. 7a, the centerlines A2, A3 of the outlet conduits of the clocked embodiment shown in FIG. 7b does not intersect the axis A1.

Referring again to FIG. 4, and as is also shown in FIG. 7B, the clocking of the exhaust conduits may be characterised by an angle θ2 defined between the centreline A3 and a radius of conduit 33 at outer wall 33b at the point P where the outer wall 33b intersects centreline A3, as projected in the Y-Z plane. When clocked such that θ2 is non-zero (as is the case in FIG. 7A), and θ2 greater than zero is a feature that is indicative of conduit clocking "earlier" in the flow swirl, or upstream relative to the swirl direction. More discussion on the effects of such clocking are below. However, such clocking of the outlet conduits also results in a lateral offset A (FIG. 4) between the centerlines A2, A3 of the outlet conduits 30, 32 as measured in the Y-Z plane, and an offset A' between the centerlines A2, A3 of the outlet conduits 30, 32 and a parallel line passing through centre A1, as measured in the Y-Z plane. In the example of FIG. 4, it can be seen that the clocking may be arranged such that the peripheral wall of the outlet conduits 30, 32 intersect the body of conduit 33 approximately tangentially on one side of the conduits 30,32.

Referring still to FIG. 4, clocking of splitter(s) 42 may characterised by an angle θ4 defined between an outlet centerline A2, A3 and the splitter line L1 passing through the adjacent splitter 42 and the centre A1, as projected in the projection Y-Z plane. In the example of FIG. 4, θ4 is less than 90 degrees but greater than 0 (i.e. the outlet centerline A2, A3 is not perpendicular to the splitter line L1). This feature is indicative of splitter clocking towards one outlet conduit and away from the other. As noted above, clocking of the splitter is beneficial when it splits the flow "earlier", or upstream relative to the swirl direction, and so θ4 being less than 90° indicates a clocking upstream of the splitter 42. Since θ7 is complementary to θ4, by corollary θ7 increases greater than 90°.

Although the example of FIG. 3 shows clocking of both splitters and outlet conduits, beneficial results may be achieved by clocking only one of these features and not the other. As well, for simplicity of description, common reference numerals are used for outlet clock angle θ2 and splitter clock angle θ4 for each outlet and splitter, respectively, though it will be understood they need not be the same for both (all) splitters and/or outlets. When the angles θ2, θ4, θ7 are the same for each outlet and splitter, the exhaust duct will have a rotational symmetry about axis A1. Such symmetry is not essential to the present concept.

Referring momentarily again to FIG. 7A, prior art symmetrical exhaust duct 220 has a splitter clock angle θ4, θ7=90°, meaning that the splitter is offset from the conduit axes A2, A3 by 90°) and the outlet conduit angle θ2=0, meaning that the conduit outlet axis A2, A3 is coaxial with a radius joining the intersection of the axis and the conduit 233 outer wall. Lateral offsets A, A' (not indicated in FIG. 7A) are also zero, meaning the centerlines are coaxial and pass through centre/centreline A1.

The clocking, which will be described in greater detail below, may be configured to enhance the efficiency of the exhaust duct 20 by taking advantage of the swirl of the inlet flow IF. Swirl, induced by the general operation of the gas turbine engine 10, may lead to pressure losses and, thus, is usually sought to be reduced in exhaust ducts. Optimising the flow rate through the exhaust duct 20 while taking account of the swirl of the inlet flow IF, instead of aiming to reduce the swirl, may yield advantages. Swirl of the inlet flow IF, travelling in a swirl direction illustrated by arrow S in FIGS. 4 and 5, may be characterised by a swirl angle (not indicated) between a tangential component of the velocity and an axial component of the velocity. Because the local swirl angle is different between an inner side and an outer side of the inlet conduit 26, swirl is referred to herein is the average swirl angle of the inlet flow IF. In this example, in FIG. 4 the swirl direction is in the counter-clockwise direction. It is contemplated that in some cases swirl may optionally be decreased by vanes, for example disposed at or near the inlets 37, 39. Although discussed in more detail below, it is noted that the conduits 30, 32, have been clocked in a direction opposite to swirl direction S, as compared to a "unclocked" prior art duct of FIG. 7A.

Reference will now be made to FIG. 5, which depicts schematic views of an exhaust duct 20 according to another aspect of the present description (in dotted line) superimposed upon the unclocked prior art exhaust duct 220 (in solid lines) of FIG. 7A.

The clocking of the duct 20 may be achieved, in an example, by having the splitters 42 of the exhaust duct 20 clocked in a direction opposite to the swirl direction S of the inlet flow IF. The clocking may be defined by angle θ1 between the vertical plane V (or any other X-Z plane) and splitter line L1, a line in the Y-Z plane passing through centre A1 and a splitter 42. In the example of FIGS. 4 and 5, the particular alignment of splitters 42 results in coaxial splitter lines L1, but this is a matter of design choice and does not need to be so. The splitters 42 deflect inlet flow IF toward inlets 37, 39 of the outlet conduits 30, 32, and by redirecting the inlet flow IF "earlier", i.e. with the clocked splitters 42 disposed upstream relative to swirl direction S versus the unclocked position of the prior art duct (FIG. 7A), the inlet flow IF may be directed downstream toward the adjacent outlet conduit 30, 32 earlier which may beneficially result in less pressure loss and increased flow rate. The inlet flow IF may thus spend less time swirling in the conduit 33, and as a result, total pressure loss may be decreased. Because the outlet flow EF can be used as a residual thrust to the engine 10, total pressure loss is preferably as minimal as optimal. The splitter clock angle θ4/θ7 may be chosen as a function of the swirl angle of the inlet flow IF. For example, larger swirl angles may require greater clocking. While in general having a more upstream clocked position for the splitter may benefit the flow rate through the outlet conduits 30, 32, the angle θ7 is preferably not so big (and by corollary θ4 not so small) that the splitter 42 become aligned with the inlets 37, 39 of the upstream outlet conduit 30, 32 and obstruct the flow through the inlets 37, 39. Thus, there is an optimal limit on the size of the splitter clock angle θ4/θ7.

Figure 6B:
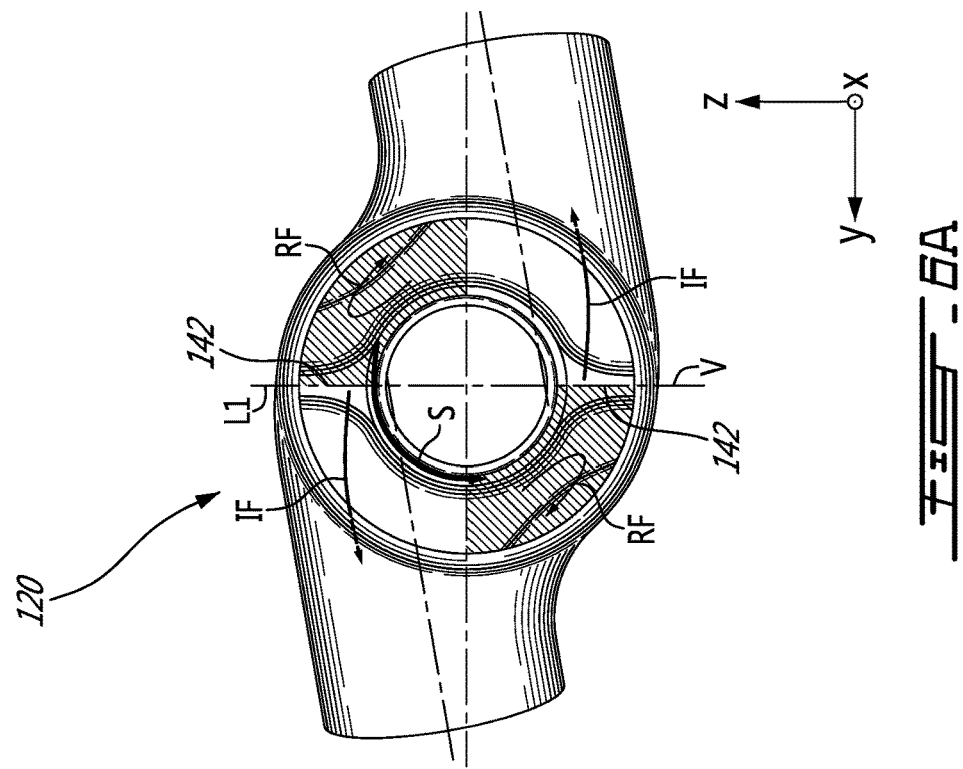
FIG. 6B is a schematic rear plan view of the exhaust duct with clocked splitters annotated to show a possible reverse flow area.

Clocking the splitters 42 as described may also reduce an area where the flow is reversed as a result of impacting the conduit 33, as will now be further described. FIG. 6A shows an example of an exhaust duct 120 according to the present description having clocked outlet conduits (not indicated) but unclocked splitters 142 (i.e. the splitters are located on the vertical line V contained in central plane X-Z), and FIG. 6B shows an example of a similar exhaust duct 120' but also having clocked splitters 142'. The area of the expected reverse flow RF is schematically illustrated by hatched shading, and a reversing arrow RF. The area of the expected reverse flow RF is smaller in the case of the exhaust duct 120' as a result of having clocked splitters 142' positions more closely relative to the exhaust duct 120 than the area of the expected reverse flow RF in the exhaust duct 120 having unclocked splitters 142. By having less reverse flow RF in the exhaust duct 120', the total pressure loss may be reduced relative to the reverse flow RF in the exhaust duct 120. However, as mentioned above, while the exhaust duct 20 shown in FIGS. 4-5, has clocked splitters 42, it is contemplated that the exhaust duct 20 could have unlocked splitters (e.g. as shown in FIG. 6A or 7B) or no splitters at all.

As described above, the outlet conduits 30, 32 of the exhaust duct 20 may be clocked in a direction opposite to the swirl direction S, as shown in the examples of FIGS. 4 and 5, so that the swirling incoming flow IF is more easily (i.e. with less loss) directed into the outlet conduits 30, 32. As already discussed, the clocking is observed from a front of the exhaust duct 20, as shown in FIG. 4. Clocking the outlet conduits 30, 32 allows to position the inlets 37, 39 of the outlet conduits 30, 32 to reduce the turning of the incoming flow IF when the flow transitions from the conduit 33 to the outlet conduits 30, 32. Clocking thus may provide for a smoother, and more tangentially-directed transition flow from the conduit 33 to the outlet conduits 30, 32, as illustrated by the arrow 52 in FIG. 4 and FIG. 5, as compared to the transition flow direction illustrated by arrow 53 in the superimposed unclocked exhaust duct 220 in FIG. 5. A smoother transition may also manifest itself as a relatively smaller total pressure loss for the outlet. As noted by comparing FIGS. 4 and 5, the amount of outlet conduit clocking may be adjusted to suit particular design needs. As previously noted, the example of FIG. 4 has outlet conduit clocking such that the outlet conduits have outer surface approximately tangential with the inlet conduit 33. In the example of FIG. 5, the outlet conduits are clocked, or offset, to a lesser extent (that is θ2 in FIG. 4 is greater than θ2 in FIG. 5).

As shown in FIG. 4 centerline angle θ3 (i.e. the angle between centerline A3 and the horizontal plane H, as projected in the Y-Z plane) locates a position of the outlet centerline A3 of the conduit 32 relative to the horizontal plane when projected in the Y-Z plane. The angle θ3 is the oriented angle from the outlet centerline A3 to the horizontal plane H (plane Y-Z), as projected in the projection plane PP (plane Y-Z). For the radius R passing through the intersection point P3 to be at the angle θ3, the intersection point P3 has to be disposed away from the horizontal line intersecting the centerline A1. Thus, taking again the example of the outlet conduit 32, having as the angle θ2 increases, a position of the outlet conduit 32 moves downwardly, and as the angle θ3 increases, and inclination of the outlet conduit 32 relative to the horizontal H increases.

The clocking of the outlet conduits 30, 32 may be characterised in the example of FIG. 4 by having the outlet centerlines A2, A3 laterally offset from one another by a distance A, and offset by a distance A'; from a parallel line passing through axis A1 projected in the Y-Z plane. The offset A' for each outlet need not be the same and the amount of clocking may vary (compare FIGS. 4 and 5, for example) according to design requirements. As mentioned, clocking is in the direction opposite of swirl direction S.

As previously discussed, FIG. 7A illustrates the prior art exhaust duct 220 having unclocked conduits 230, 232 and unclocked splitters 242. FIG. 7B, on the other hand, illustrates an exhaust duct 220' having clocked outlet conduits 230', 232'. In the exhaust duct 220', outlet centerlines A2 and A3 of the conduits 230', 232' are clocked by the outlet clocking angle θ2. In the example shown in FIG. 7B, the conduits 230', 232' do not have an inclination angle θ3 (see FIG. 4) between the centerlines A2, A3 and horizontal plane H is zero, that is, the centrelines A2, A3 are parallel to the horizontal plane H. From FIG. 7B, it can be appreciated that the two outlet conduits 230' and 232' extends through the circumscribing wall of the annular inlet conduit 233 along respective outlet centerlines A2, A3 that are distinct from one another (i.e. laterally offset A, A'). When projected onto plane Y-Z as shown in FIG. 7B, the outlet centerlines A2, A3 of the at least two outlet conduits intersect the circumscribing wall 233b of the annular inlet conduit at respective intersection points P2, P3 and a radius R of the annular inlet conduit passes through each of the intersection points P2, P3 at the angle θ2. Clocking is in a direction opposite to an anticipated swirl direction S of the combustion gases in the inlet conduit. In an example where the swirling direction S is counter-clockwise, the outlet conduits 30, 32 are clocked in the clockwise direction.

As with previous examples, the outlet clocking angle θ2 may provide a more smooth transition from the conduit 233 to the outlet conduits 230, 232, as illustrated by the arrow 52 in FIG. 7B, compared to a prior art "unclocked" design in FIG. 7A.

The clocking of the outlet conduits 230', 232' in the direction opposite to the swirling flow S may also be characterised by a tangent angle θ6 (shown in FIG. 7B as the angle between the intersection P3 of the centreline A3 and a tangent T to the periphery of the conduit 33) that acute and, it will be understood, is equal to 90°−θ2. The tangent angle θ6 is oriented from the outlet centerline A3 to a tangent T to the periphery of the conduit 233 (i.e. circumscribing wall 233b, not indicated in FIG. 7B), as projected in the Y-Z plane. If the outlet conduits 230', 232' were to be clocked in same the direction of the swirling flow S, the tangent angle θ6 would be obtuse, while unclocked outlet conduits like FIG. 7A have an angle θ6 of 90°. A similar angle θ6 may be measured in respect of conduit 230' and its centreline A2, though the angle may not be the same magnitude, depending on conduit 230' placement.

The presence of, and/or amount of, clocking of the splitters 42 and the outlet conduits 30, 32 may be chosen independently from one another, though in practice they are both related to inlet swirl angle. For example, an exhaust duct 20 may have clocking of the splitters 42 only (in this case, the outlet centerlines A2, A3 of the outlet conduits 30, 32 would be coaxial), or clocking of the outlet conduits 30, 32 only (in this case, the outlet centerlines A2, A3 of the outlet conduits 30, 32 are non-coaxial, and distinct, and in some examples parallel).

Referring jointly to FIGS. 4 and 5, outlet conduit clocking may be characterised by a non-zero, positive conduit clock angle θ2, while splitter clocking may be characterised by a splitter clock angle θ4 that is less than 90° (or θ7 greater than 90°).

According to one embodiment, there is provided an exhaust duct for exhausting combustion gases of a gas turbine engine, the exhaust duct comprising: an annular inlet conduit centered relative to a point of origin of an axis system of X-Y-Z orthogonal axes and having an axial extension along the X axis, and at least two outlet conduits branching off from the annular inlet conduit, the at least two outlet conduits being offset from one another as viewed when projected in plane Y-Z, and wherein the at least two outlet conduits are offset circumferentially upstream from the Y axis relative to an anticipated swirling flow direction of the combustion gases.

According to another embodiment, there is provided an exhaust duct for exhausting a swirling flow of combustion gases of a gas turbine engine defining X-Y-Z orthogonal axes, the exhaust duct comprising: an annular inlet conduit having an axial extension along the X axis, and at least two outlet conduits branching off from the annular inlet conduit, the at least two outlet conduits being offset from one another as viewed when projected in plane Y-Z, and wherein the at least two outlet conduits are clocked about the annular inlet conduit in a direction opposite to an anticipated swirling flow direction of the combustion gases.

According to a further embodiment, there is provided an exhaust duct for a gas turbine engine, the exhaust duct comprising: a body having an annular conduit defining a central axis in an axial direction, the annular conduit having an axially disposed inlet conduit for receiving a swirling inlet flow from a turbine section of the gas turbine engine, the body having at least two outlet conduits connected to a circumscribing wall of the conduit, each of the outlet conduits having an outlet centerline, the outlet centerlines being distinct, and when projected onto a projection plane perpendicular to the central axis the outlet centerlines being offset from the central axis.

According to a still further embodiment, there is provided an exhaust duct for a gas turbine engine, the exhaust duct comprising a body defining an annular conduit defining a central axis in an axial direction, the annular conduit having an axially disposed inlet conduit for receiving a swirling inlet flow from a turbine section of the gas turbine engine, and at least two outlet conduits branching off from an outer circumscribing wall of the annular conduit, the annular conduit including diametrically opposed splitters, a splitter line joining the opposed splitters, the body being dissymmetric relative to an axially oriented plane containing the splitter line.

The above description is meant to be exemplary only, and one skilled in the art will recognize that changes may be made to the embodiments described without departing from the scope of the invention disclosed. Although a turbo-prop engine is described herein, the above described splitter could be used in a turbo-shaft engine. Although the examples are rotationally symmetric, other designs may be provided. Any suitable number of exhaust outlets may be provided, i.e. 2, 3 or more. The configuration of the ducts, conduits, and splitters may be any as suitable. Still other modifications which fall within the scope of the present invention will be apparent to those skilled in the art, in light of a review of this disclosure, and such modifications are intended to fall within the appended claims.

The invention claimed is:

1. An exhaust duct for exhausting combustion gases of a gas turbine engine, the exhaust duct comprising: an annular inlet conduit having an inlet centerline A1 defining an axial direction, the inlet conduit configured to direct combustion gases generally in the axial direction and with a swirl direction about the inlet centerline A1, the exhaust duct further comprising at least two outlet conduits communicating with the inlet conduit and extending generally radially outward relative to the inlet conduit along respective outlet centerlines A2, A3, wherein when projected in a Y-Z plane orthogonal to the inlet centerline A1, the outlet centerlines A2, A3 are non-coaxial and clocked in an opposite direction to the swirl flow direction, wherein splitters are provided in the annular inlet conduit, the splitters being circumferentially positioned away from where the circumscribing wall of the annular inlet conduit is intersected by the at least two outlet conduits and configured to deflect the combustion gases towards the at least two outlet conduits, wherein the splitters include bumps on an inner surface of a downstream end of the annular inlet conduit.

2. The exhaust duct defined in claim 1, wherein the at least two outlet conduits extend through a circumscribing wall of the annular inlet conduit along their respective outlet centerlines A2, A3 that are distinct from one another, the outlet centerlines A2, A3 when projected onto the Y-Z plane being spaced apart from the inlet centerline A1 so as not to intersect the inlet centerline A1.

3. The exhaust duct defined in claim 1, wherein the splitters include a pair of diametrically opposed splitters, and wherein clocking of the at least two outlet conduits about the annular inlet conduit is defined as A>0 and θ4≤90 degrees, where A is a distance between respective centerlines A2, A3 of the outlet conduits as measured in the Y-Z plane, and wherein θ4 is an angle between each of the centerlines A2, A3 and a line L1 joining the diametrically opposed splitters in the Y-Z plane.

4. The exhaust duct defined in claim 1, wherein when projected onto the Y-Z plane:
the respective outlet centerlines A2, A3 of the at least two outlet conduits intersect a circumscribing wall of the annular inlet conduit at respective intersection points P2, P3, a tangent T of the circumscribing wall passes through each of the intersection points P2, P3, a tangent angle θ6 from each tangent T to an associated one of the centerlines A2, A3 is acute and in a direction opposite to the swirling flow direction of the combustion gases.

5. The exhaust duct defined in claim 1, wherein when projected onto the Y-Z plane:
the respective outlet centerlines A2, A3 of the at least two outlet conduits intersect a circumscribing wall of the annular inlet conduit at respective intersection points P2, P3, a radius R of the annular inlet conduit passes through each of the intersection points P2, P3, a radius angle θ2 is defined from respective outlet centerlines A2, A3 to the radius R, and wherein the radius angle θ2 is acute and in a direction opposite to the anticipated swirling flow direction of the combustion gases.

6. The exhaust duct as defined in claim 1, wherein when projected onto Y-Z plane:
respective outlet centerlines A2, A3 of the at least two outlet conduits intersect a circumscribing wall of the annular inlet conduit at respective intersection points P2, P3, an outlet line L2 joins the two intersection points P2, P3, and wherein the exhaust duct further comprises a splitter in the inlet conduit between the at least two outlet conduits, the splitter defining a splitter line L1, and wherein the exhaust duct has a first angle θ4 between any of the outlet centerlines A2, A3 and the splitter line L1 being other than 90 degrees.

7. An exhaust duct for exhausting a swirling flow of combustion gases of a gas turbine engine defining X-Y-Z orthogonal axes, the exhaust duct comprising:
an annular inlet conduit having an axial extension along the X axis,
at least two outlet conduits branching off from the annular inlet conduit, and
at least one pair of diametrically opposed splitters in the annular inlet conduit and extending generally along the X axis, the at least two outlet conduits being dissymmetric relative to a splitter line L1 defined by the at least one pair of diametrically opposed splitters, the at least one pair of diametrically opposed splitters configured to deflect the swirling flow of combustion gases towards the at least two outlet conduits, the at least one pair of diametrically opposed splitters disposed axially in the annular inlet conduit where the at least two outlet conduits branch off from the annular inlet conduit.

8. The exhaust duct defined in claim 7, wherein when projected onto plane Y-Z:
respective outlet centerlines A2, A3 of the at least two outlet conduits intersect a circumscribing wall of the annular inlet conduit at respective intersection points P2, P3, a tangent T of the circumscribing wall passes through each of the intersection points P2, P3, a tangent angle θ6 from each tangent T to an associated one of the centerlines A2, A3 is acute and in a direction opposite to an anticipated swirling flow direction of the combustion gases.

9. The exhaust duct defined in claim 7, wherein when projected onto plane Y-Z: respective outlet centerlines A2, A3 of the at least two outlet conduits intersect a circumscribing wall of the annular inlet conduit at respective intersection points P2, P3, a radius R of the annular inlet conduit passes through each of the intersection points P2, P3, a radius angle θ2 is defined from the Y axis to the radius R, the radius angle θ2 is acute and in a direction opposite to an anticipated swirling flow direction of the combustion gases.

10. The exhaust duct defined in claim 7, wherein when projected onto plane Y-Z:
respective outlet centerlines A2, A3 of the at least two outlet conduits intersect a circumscribing wall of the annular inlet conduit at respective intersection points P2, P3, an outlet line L2 joins the two intersection points P2, P3, and the exhaust duct has a first angle θ4 between one of the outlet centerlines A2, A3 and the splitter line L1 being less than 90 degrees.

11. An exhaust duct for exhausting a swirling flow of combustion gases received from a turbine section of a gas turbine engine defining X-Y-Z orthogonal axes, the exhaust duct comprising: an annular inlet conduit circumscribed by a circumscribing wall having an axial extension along the X axis, and at least two outlet conduits branching off from the annular inlet conduit, the at least two outlet conduits extending through the circumscribing wall of the annular inlet conduit along respective outlet centerlines A2, A3 that are distinct from one another, wherein when projected onto plane Y-Z: the outlet centerlines A2, A3 of the at least two outlet conduits intersect the circumscribing wall of the annular inlet conduit at respective intersection points P2, P3, wherein a radius R of the annular inlet conduit passes through each of the intersection points P2, P3, a radius angle θ2 is defined from respective outlet centerlines A2, A3 to the radius R, and wherein the radius angle θ2 is acute and in a direction opposite to an anticipated swirling flow direction of the combustion gases, the exhaust duct further comprising a pair of diametrically opposed splitters configured to guide the swirling flow of combustion gases towards respective ones of the at least two outlet conduits, the pair of diametrically opposed splitters axially disposed in the annular inlet conduit where the at least two outlet conduits branch off from the annular inlet conduit.

12. The exhaust duct defined in claim 11, wherein clocking of the at least two outlet conduits about the annular inlet conduit is defined as A>0 and B≤90 degrees, where A is a distance between respective centerlines A2, A3 of the outlet conduits as measured in plane Y-Z, and wherein B is an angle between each of the centerlines A2, A3 and a line L1 joining the diametrically opposed splitters in plane Y-Z.

13. An exhaust duct for exhausting combustion gases of a gas turbine engine, the exhaust duct comprising: an annular inlet conduit having an axis A1, an outer wall having a radius from the axis, the inlet conduit configured to direct combustion gases generally in the axial direction and with a swirl direction about the axis A1, the exhaust duct further comprising at least two outlet conduits extending generally outwardly radially relative to the inlet conduit along respective outlet centerlines A2, A3, wherein when projected in a Y-Z plane orthogonal to the axis of the inlet conduit, the outlet centerlines A2, A3 are non-coaxial and wherein a non-zero, positive outlet conduit angle θ2 exists between the centrelines A2,A3 and a line along the radius intersecting the centrelines A2, A3 at the outer wall of the inlet conduit when projected into the Y-Z plane and measured in a rotational direction opposite to the swirl direction, and wherein the exhaust further comprises a pair of diametrically opposed splitters configured to deflect the combustion gases towards at least two outlet conduits, the pair of diametrically opposed splitters axially disposed in the annular inlet conduit at a location where the at least two outlet conduits extend from the annular inlet conduit.

14. The exhaust duct defined in claim 13, wherein the respective angles θ2 with each centreline A2, A3 is less than 90°.

15. The exhaust duct defined in claim 13, wherein the respective angles θ2 with each centreline A2, A3 are equal to one another.

16. An exhaust duct for exhausting combustion gases of a gas turbine engine, the exhaust duct comprising: an annular inlet conduit having an axis A1, an outer wall having a radius from the axis, the inlet conduit configured to direct combustion gases generally in the axial direction and with a swirl direction about the axis, the exhaust duct further comprising at least two outlet conduits extending generally outwardly radially from the inlet conduit along respective outlet centerlines A2, A3, the inlet conduit having a splitter therein upstream of each outlet conduit relative to the swirl direction, each splitter defining a splitter line L1 passing radially through the splitter and the axis A1, the splitter located relative to centerline A2, A3 of the respective downstream outlet conduit by a clocking angle θ7 defined between the respective centerline A2, A3 and the splitter line L1 when projected in a plane orthogonal to the axis, wherein θ7 is greater than 90°, and wherein each splitter is configured to deflect the combustion gases towards a corresponding one the at least two outlet conduits, wherein the splitters are axially positioned where the at least two outlet conduits extend from the annular inlet conduit.

17. An exhaust duct as defined in claim 16 wherein the respective angles θ7 with each splitter are equal to one another.

* * * * *